(12) United States Patent
Schoenenberger

(10) Patent No.: US 9,828,182 B2
(45) Date of Patent: Nov. 28, 2017

(54) SUSPENDED POUCH COMPRISING INTERCHANGEABLE ELEMENT

(71) Applicant: RSL LOGISTIK GMBH & CO. KG, Landsberg (DE)

(72) Inventor: Rolf Schoenenberger, Landsberg/Lech (DE)

(73) Assignee: RSL LOGISTIK GMBH & CO. KG, Landsberg (DE)

( * ) Notice: Subject to any disclaimer, the term of this patent is extended or adjusted under 35 U.S.C. 154(b) by 0 days.

(21) Appl. No.: 15/121,022

(22) PCT Filed: Feb. 16, 2015

(86) PCT No.: PCT/EP2015/053204
§ 371 (c)(1),
(2) Date: Aug. 23, 2016

(87) PCT Pub. No.: WO2015/124525
PCT Pub. Date: Aug. 27, 2015

(65) Prior Publication Data
US 2017/0015505 A1  Jan. 19, 2017

(30) Foreign Application Priority Data

Feb. 24, 2014 (DE) .................. 10 2014 203 299

(51) Int. Cl.
*B65G 17/20* (2006.01)
*B65G 17/48* (2006.01)
*B65G 33/00* (2006.01)

(52) U.S. Cl.
CPC ........... *B65G 17/485* (2013.01); *B65G 17/20* (2013.01)

(58) Field of Classification Search
CPC .................................. B65G 17/485
(Continued)

(56) References Cited

U.S. PATENT DOCUMENTS 3,778,972 A * 12/1973 Chlipalski ............... B65B 5/061
414/789.2
4,873,812 A * 10/1989 Pavel ...................... B65B 25/20
53/241

(Continued)

*Primary Examiner* — Douglas Hess
(74) *Attorney, Agent, or Firm* — Eversheds Sutherland (US) LLP

(57) ABSTRACT

The invention relates to a suspended pouch (10) acting as a container for conveyed goods for transporting goods to be conveyed in a suspended conveyor device, comprising a first pouch side wall (12) and a second pouch side wall (14) which can be unfolded and folded up to open and close a conveyed goods receiving region (16), and comprising a suspension means (20), the first pouch side wall (12) comprising a rigid edge contour region (12r) and being connected at said region to the suspension means (20) so as to be pivotable about a pivot axis (26), and the second pouch side wall (14) being connected to the suspension means (20), or said suspension means being able to act on said second side wall, in such a way that the first and second pouch side wall (12, 14) can be unfolded and folded up by pivoting the first pouch side wall (12) about the pivot axis (26), wherein the suspended pouch (10) comprises a basic unit (50) and an interchangeable element (60), the basic unit (50) comprising the suspension means (20) and the rigid edge contour region (12r), and the interchangeable element (60) comprising at least part of the second pouch side wall (14), preferably the entire second pouch side wall (14), and being provided on the basic unit (50) in a replaceable manner.

15 Claims, 3 Drawing Sheets

(58) Field of Classification Search
USPC .............................. 198/713, 714, 715, 711
See application file for complete search history.

(56) References Cited

U.S. PATENT DOCUMENTS

| | | | | |
|---|---|---|---|---|
| 4,943,168 | A * | 7/1990 | Berg | B65D 75/20 |
| | | | | 206/820 |
| 5,232,078 | A * | 8/1993 | Kuhlmann | B65G 47/61 |
| | | | | 198/360 |
| 5,660,266 | A * | 8/1997 | Nolte | B65G 15/42 |
| | | | | 198/701 |
| 6,164,440 | A * | 12/2000 | Van Bree | B65D 19/44 |
| | | | | 198/715 |
| 6,446,416 | B1 * | 9/2002 | Kuhn | B65B 35/56 |
| | | | | 198/802 |
| 7,150,374 | B1 * | 12/2006 | Camps | B65D 25/04 |
| 7,637,081 | B2 * | 12/2009 | Murakami | A47F 13/085 |
| | | | | 53/384.1 |
| 8,490,774 | B2 * | 7/2013 | Janzen | B65G 19/025 |
| | | | | 198/384 |
| 8,607,963 | B2 * | 12/2013 | Wend | B65G 19/025 |
| | | | | 141/250 |
| 8,672,118 | B2 * | 3/2014 | Janzen | B65G 17/32 |
| | | | | 198/678.1 |
| 9,187,252 | B2 * | 11/2015 | Wend | B65G 17/12 |
| 9,527,613 | B2 * | 12/2016 | Bazany | B65D 1/22 |
| 9,630,751 | B1 * | 4/2017 | Otto | B65G 17/20 |
| 2017/0088302 | A1 * | 3/2017 | Auf Der Maur | |

* cited by examiner

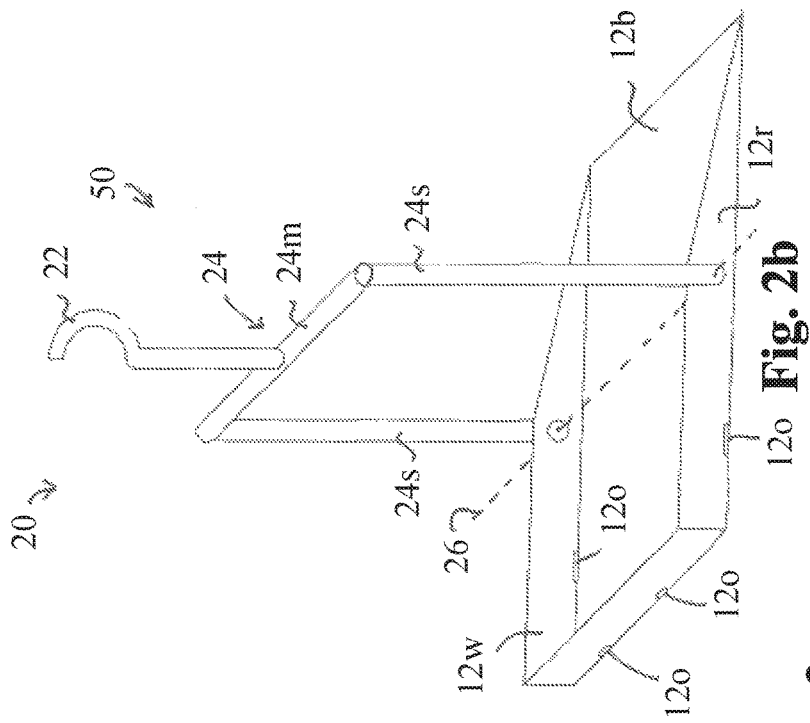
Fig. 2
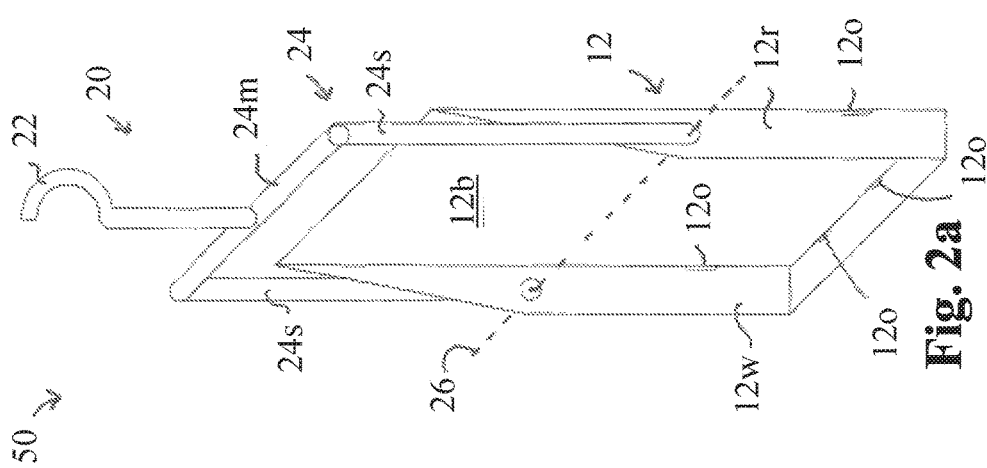

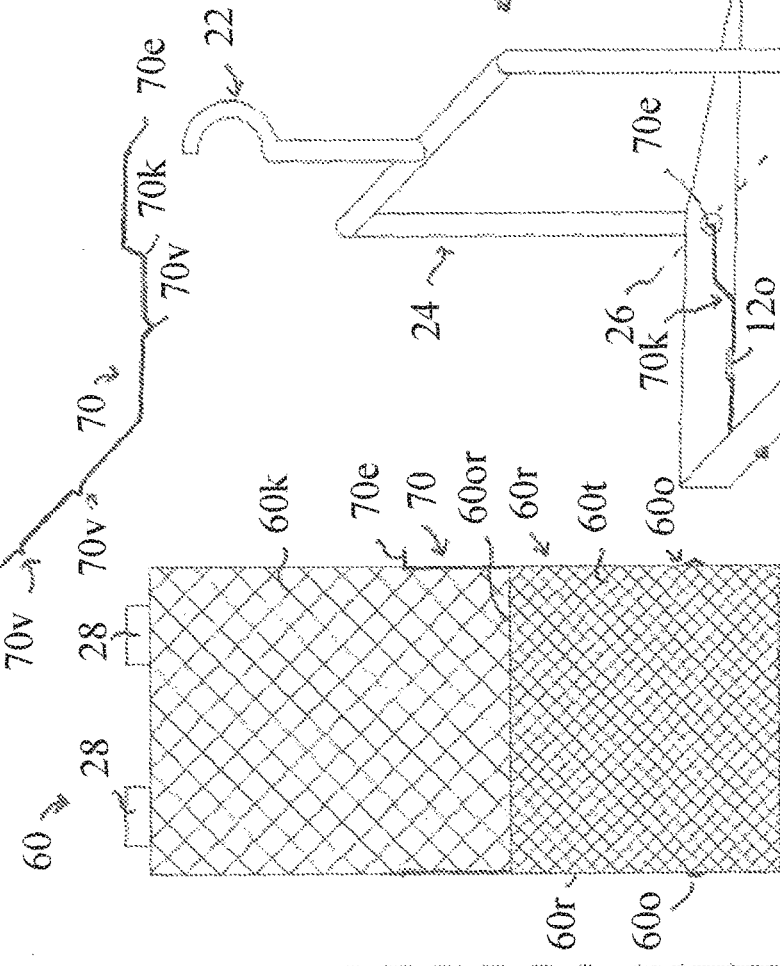
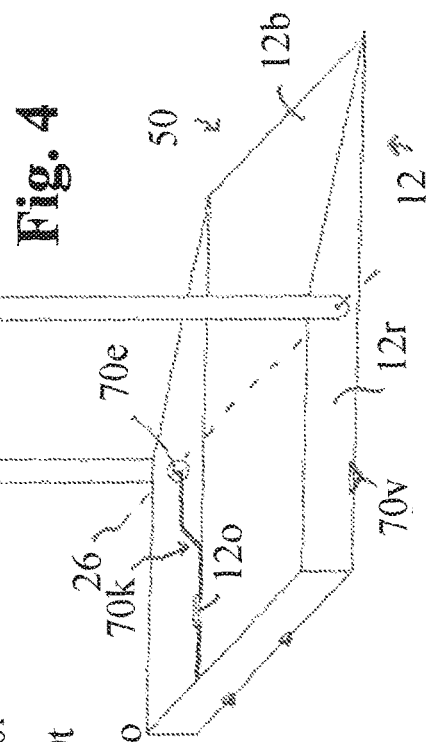
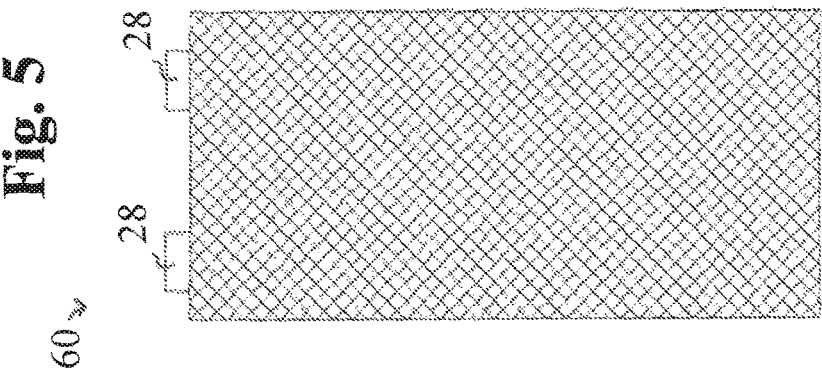

SUSPENDED POUCH COMPRISING INTERCHANGEABLE ELEMENT

CROSS-REFERENCE TO RELATED APPLICATIONS

This application is a national stage application, filed under 35 U.S.C. §371, of International Application No. PCT/EP2015/053204, filed on Feb. 16, 2015, titled "Suspended Pouch Comprising Interchangeable Element," which claims priority to German Patent Application No. 10 2014 203299.7, filed on Feb. 24, 2014, the entire contents of each of which are hereby incorporated herein in their entirety for all purposes.

The present invention relates to a suspended pouch acting as a conveyed goods container for transporting goods to be conveyed in a suspended conveyor device, comprising a first pouch side wall and a second pouch side wall which, being opposite one another, define a conveyed goods receiving region therebetween and are interconnected in a hinge connection region such that they can be unfolded and folded up to open and close the conveyed goods receiving region, and comprising a suspension means for suspending the suspended pouch on a guide rail arrangement of a suspended conveyor device. In this case, the first pouch side wall comprises at least one rigid edge contour region and is connected at said region to the suspension means so as to be pivotable about a pivot axis, and the second pouch side wall is connected to the suspension means, or the suspension means can act on said second pouch side wall, in such a way that the first and second pouch side wall can be unfolded and folded up by pivoting the first pouch side wall about the pivot axis.

Suspended pouches of this type are known, for example, from WO 2014/012965 A1. The suspended pouches are designed such that they can be opened at a loading station, optionally while remaining on the suspended conveyor device, from a transport position in which the conveyed goods receiving region is largely closed and the two pouch side walls hang down substantially vertically, and specifically by pivoting the first pouch side wall out of its vertical position about the preferably horizontal pivot axis. In the process, the first pouch side wall can be moved into an at least almost horizontal position.

When the first pouch side wall pivots thus, the suspended pouch automatically unfolds since the second pouch side wall is acted upon by or connected to the suspension means, which is preferably suspended on the suspended conveyor device and is facing upwards, in such a way that it cannot follow the pivot movement of the first side wall to a significant extent.

In automated warehouses, production facilities and when transporting goods in general, there is often a need to transport as conveyed goods different items that can have a considerably different shape, material or size, and for example to combine said items into one order or purchase during an order picking process.

Against the background of this prior art, the object of the present invention is to further develop the known suspended pouch such that it can be flexibly adapted to different items to be conveyed.

According to the invention, to achieve this object, the aforementioned suspended pouch comprises or is formed of a basic unit and an interchangeable element, the basic unit comprising or being formed of the suspension means and the rigid edge contour region, and the interchangeable element comprising or being formed of at least part of the second pouch side wall, preferably the entire second pouch side wall, and being provided on the basic unit in a replaceable manner.

By constructing the suspended pouch according to the invention in two parts consisting of the basic unit and the replaceable interchangeable element, the suspended pouch can be adapted to different items to be conveyed in a simple manner by using different interchangeable elements.

By appropriately selecting a soft or cushioning material for the interchangeable element, for example, it is possible to assemble suspended pouches that are suitable, for example, for receiving particularly high-quality items or those susceptible to scratches.

Moreover, interchangeable elements of various sizes or resilience can be used to produce suspended pouches having various volumes for different size items.

Another advantage of the suspended pouch according to the invention is that the interchangeable element and the basic unit are easier to clean in this manner. The interchangeable elements can for example be removed and separately washed, preferably in a machine, in particular when they are made of a machine-washable textile material.

The replaceability of the interchangeable element should preferably be taken to mean that an interchangeable element can be attached to the basic unit and then also removed therefrom again without causing significant damage to the basic unit in the process.

The option of using a disposable interchangeable element that can, for example, be torn off from the basic unit after one use and then disposed of is in principle not ruled out, in particular when said element is used for items to be conveyed that cause heavy soiling.

For cost and environmental reasons, however, the interchangeable element is preferably designed to be repeatedly attached to and removed from the basic unit, and particularly preferably without being significantly damaged in the process and also without causing damage to the basic unit.

The assembly can be made simpler and quicker by the interchangeable element being designed such that it can be attached to and removed from the basic unit without using tools such as screwdrivers or the like, as will be described in more detail below.

According to a preferred development, at least portions of the interchangeable element are made of a flexible material, in particular a textile and/or resiliently yielding material, preferably plastics material, for example a resilient plastics film.

As a result, the interchangeable element can adapt to different size items to be conveyed and can press said items against the first pouch side wall when the suspended pouch is in the closed position and thus fix them in place at least to a certain extent.

Furthermore, the option of designing the interchangeable element as an least partially dimensionally stable element, for example a sturdy frame that is mounted on the basic unit in a replaceable manner and has a preferably resilient textile or film covering, or as a completely dimensionally stable element, for example a replaceably mounted cover or lid, should not be ruled out.

To be able to attach the interchangeable element to the basic unit more simply and/or to provide effective protection for the goods being conveyed from external influences or to receive said goods particularly securely, the interchangeable element can be formed as a sleeve open on at most two sides or as a pouch open on at most one side. The interchangeable element can thus be formed as a type of "rucksack" that is provided in a replaceable manner on the basic unit acting as a support frame.

It is possible to mount the interchangeable element on the basic unit in a particularly simple manner and largely without tools by the interchangeable element being provided on the basic unit in a replaceable manner by means of a clamp or clip connection, for example by means of a clamping clip. A person skilled in the art has numerous variants at his disposal in this respect, for example buttons, zip fasteners or hook and loop fasteners, or the like. In principle, there is no reason to rule out more complex releasable connections either, for example screw connections and releasable weld or joined connections. For example, in some cases thermal connections can be broken again by heating them again.

According to a preferred development, the first pouch side wall comprises a tray and is pivotally connected at the tray to the suspension means, the interchangeable element being provided on the tray in a replaceable manner. In this case, the tray can have different shapes (rectangular, round, oval, etc.) and can be made for example of hard plastics material or another dimensionally stable material, for example in thermoforming technology. As a result, the stability of the suspended pouches is increased. It is also possible to use a cardboard material, preferably a coated cardboard material, the stability of which can be increased for example by a honeycomb-like structure.

For receiving small parts in particular, at least one pouch or a separating element can be provided on the interchangeable element to divide the conveyed goods receiving region into a plurality of sub-regions.

The suspension means of the above-described suspended pouches can comprise a hook-in device for hooking in, for example, coat hangers, for instance in the form of a hooking opening or a suitable hook, and so hung goods can also be received in the suspended pouches and transported together therewith.

The present invention also relates to a suspended pouch system comprising at least two, preferably a plurality of, suspended pouches according to the invention, as described above, or comprising suspended pouches as known from the prior art.

To achieve the aforementioned object, according to the invention the suspended pouches differ on account of at least one of the size, shape and material of the second pouch side wall or of the interchangeable element.

A suspended pouch system of this type makes it possible to flexibly adapt to different items or groups of goods to be conveyed.

Regarding this aspect of assigning specific suspended pouches to particular groups of goods, it is not necessarily important for an interchangeable element to be replaceable. In this case, the second pouch side wall can also be permanently and non-releasably connected to the first pouch side wall and/or the suspension means. However, by constructing each suspended pouch from a basic unit and an interchangeable element provided thereon in a replaceable manner, the costs of the system can be considerably reduced.

To simplify production, in particular at least the edge contour regions and the suspension means, preferably the basic units, can be the same for the at least two suspended pouches, preferably for a plurality or all of the suspended pouches of the suspended pouch system.

In particular in large warehouses, in which various orders are assembled and a plurality of different types of suspended pouches are accordingly used, the second pouch side walls or the interchangeable elements can preferably each be provided with an ID that can preferably be read automatically, for example in the form of a barcode, a 2D code or an RFID transponder. In particular, when different basic units are used in one system, it may be advantageous to additionally provide the basic units with appropriate IDs too.

IDs of this type make it simpler to select or assemble suspended pouches for particular items in an automated manner.

Lastly, also claimed is a suspended conveyor device that comprises a suspended pouch system according to any of claims 8 to 10 comprising suspended pouches according to any of claims 1 to 7, a guide rail arrangement on which the suspended pouches can be moved in a guided manner, and separate stores for the basic units and the various interchangeable elements.

In this respect, according to the invention the suspended conveyor device comprises at least one station for the manual or at least partially automated, preferably completely automated, assembly of suspended pouches, which station is designed to assemble each suspended pouch from one basic unit and one selected interchangeable element.

During operation of a suspended conveyor device of this type, the suspended pouches or the components thereof assigned to particular groups of goods can be guided towards the relevant goods, and so in this respect the suspended pouches can already be pre-sorted according to the goods they are to transport.

The present invention will be explained below on the basis of a preferred embodiment of a suspended pouch, which is shown in the accompanying FIGS. 1 to 5, in which:

FIG. 2 shows, in sub-FIGS. 2a) and 2b), the basic unit of the suspended pouch from FIG. 1 in the transport position (a) and the loading position (b).

FIG. 3 shows a clamping clip as an example of a fastening means for replaceably fastening the interchangeable element to the basic unit of the suspended pouch from FIG. 1.

FIG. 4 shows the subject matter of FIG. 2b) with a clamping clip from FIG. 3 inserted, and FIG. 5 shows, in sub-FIGS. 5a) and 5b), the interchangeable element of the suspended pouch from FIG. 1 from the front (a) and the rear (b), the clamping clip from FIG. 3 being inserted into the interchangeable element in sub-FIG. 5b).

Figure 1:
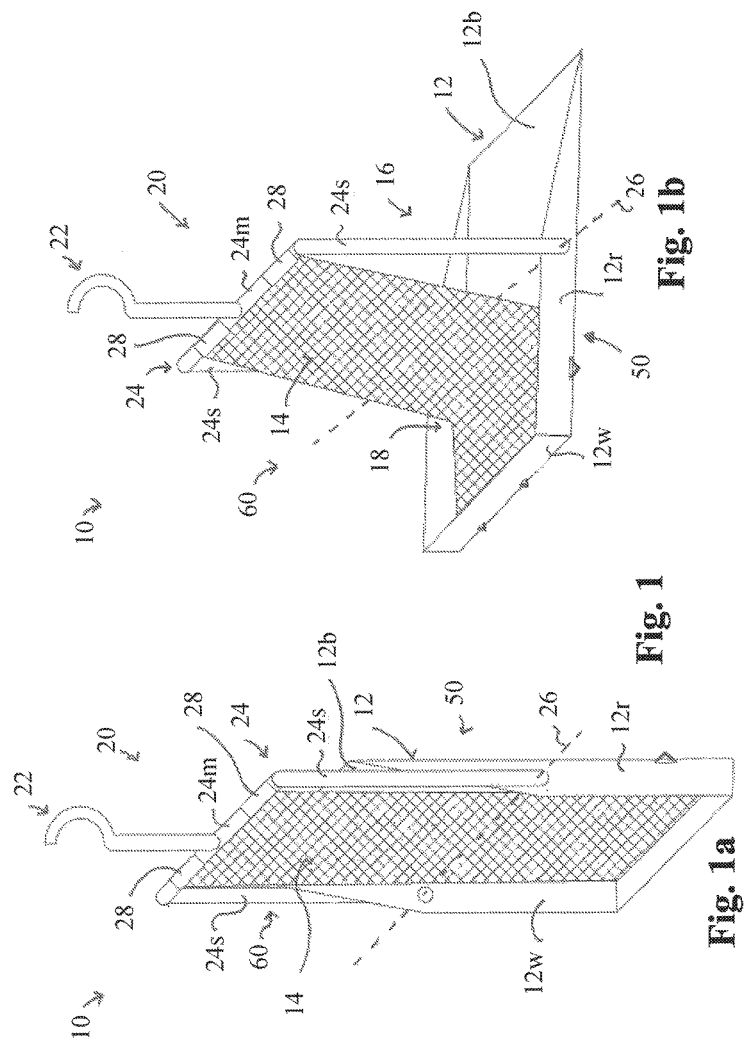
FIG. 1 shows, in sub-FIGS. 1a) and 1b), the embodiment of the suspended pouch according to the invention in a transport position (a) and in a loading position (b).

All the figures are highly simplified schematic drawings that are intended to merely illustrate the principle of the invention and should in particular not be understood as being definitive. So as to not overload the figures, not all the elements in each figure are provided with reference numerals, in particular where one figure contains a large number of the same element.

FIG. 1 shows an embodiment of a suspended pouch 10 acting as a conveyed goods container for transporting goods to be conveyed in a suspended conveyor device (not shown in greater detail in the drawings).

The suspended pouch 10 comprises a first pouch side wall 12, in this case in the form of a dimensionally stable tray, and a second pouch side wall 14, consisting in this case of a resilient textile material, which walls, being opposite one another, define a conveyed goods receiving region 16 (cf. FIG. 1b) therebetween and are interconnected in a hinge connection region 18 such that they can be unfolded and folded up to open and close the conveyed goods receiving region 16.

FIG. 1a) shows the suspended pouch 10 in a transport position, in which the first pouch side wall 12 and the second pouch side wall 14 are folded up and hang down substantially vertically, and FIG. 1b) shows the suspended pouch 10 in a loading position, in which the first and second pouch side walls 12, 14 are unfolded and an item can be placed in the conveyed goods receiving region 16 or removed therefrom. In this case, the term "loading" is intended to include both loading and unloading.

The suspended pouch 10 according to the invention also comprises a suspension means 20 for suspending the suspended pouch 10 on a guide rail arrangement (not shown here in more detail) of a suspended conveyor device.

As in the embodiment shown, the suspension means 20 can be formed as a U-shaped bracket 24 that is provided with a hook 22 and grips two parallel legs 24s, which are interconnected by a central part 24m extending substantially horizontally. Instead of the hook 22, which is only shown here as a mere example, a conventional (mini) trolley can be used, for example. In particular, the suspension means can comprise a joint that allows it to rotate the suspended pouch, which is suspended on the guide rail arrangement, about a vertical axis (for example by up to 90°), or in this respect the suspension means can twist.

A hook-in apparatus 23, for example in the form of a slot or in the form of an eyelet protruding asymmetrically, can be provided on the suspension means 20, for example to be able to attach coat hangers to the suspension means, for items that do not fit in the suspended pouch 10 because of their size or nature and have to be transported in a suspended manner. The contours of the front face of the suspension means in the transport direction and the rear face of the suspension means in the transport direction can also be formed so as to complement each other at least in portions, preferably completely, such that adjacent suspended pouches can be "stacked" within one another, in particular when empty and in the transport position, and can be stored using little storage space, complementary contours stabilising one another.

The suspension means 20 is connected to a rigid edge contour region 12r of the first pouch side wall 12 so as to be pivotable about a pivot axis 26.

In the present embodiment, the first pouch side wall 12 is formed as a dimensionally stable tray, comprising a base 12b and a side wall 12w that projects substantially vertically therefrom on three out of four sides of the base 12b and forms the rigid edge contour region 12r.

The second pouch side wall 14 is connected at one end to the suspension means 20, more precisely to the central part 24m of the bracket 24, and so the first and second pouch side wall 12, 14 can be unfolded and folded up by pivoting the first pouch side wall 12 about the pivot axis 26.

To allow the second pouch side wall 14 to be fastened to the bracket 24 in a replaceable manner, two clamps 28 (only indicated schematically in this case) can be provided for example as fastening means.

The embodiment of the suspended pouch 10 according to the invention shown in the figures comprises a basic unit 50, which comprises the suspension means 20 and the first pouch side wall 12, and an interchangeable element 60, which comprises at least part of the second pouch side wall 14, in this case the entire pouch side wall 14, and is provided on the basic unit 50 in a replaceable manner.

FIG. 2 shows the basic unit 50 of the suspended pouch 10 according to the invention without the interchangeable element 60 and in both the transport position (a) and loading position (b).

It can clearly be seen here that there are four openings 12o in the region of the edge in which the base 12b and the side wall 12w of the first pouch side wall 12 abut one another, through which openings a clamping clip 70 (which will be described below) acting as a fastening means can be inserted in order to fix the interchangeable element 60 in position on the basic unit 50 in a replaceable manner.

The corresponding clamping clip 70 is shown by itself in FIG. 3. The clip is made, for example, from a metal wire and comprises 4 engagement protrusions 70v, which are arranged such as to pass into the openings 12o in the tray of the first pouch side wall 12 when the clamping clip 70 is mounted on the basic unit 50, as shown in FIG. 4.

In the process, the two outwardly bent ends 70e of the clamping clip 70 can be inserted into an opening in the region of the joint connection between the suspension means 20 and the first pouch side wall 12.

In the present embodiment, the interchangeable element 60 is formed as a pouch consisting of a resilient textile or plastics material, and is shown in FIG. 5 from the front (a) and the rear (b). In the figure, the different sides of the textile or plastics material are illustrated by different crosshatching.

As is clear from comparing sub-FIGS. 5a) and 5b), the interchangeable element 60 in this example is made from a layer of a textile or plastics material that is bent under at one end and has been bonded at the side edges 60r in order to form a pouch portion 60t that extends over part of the longitudinal extent of the interchangeable element 60. This pouch 60t is used to receive small parts and/or for securely fixing the interchangeable element 60 in position on the basic unit 50.

Adjoining the pouch portion 60t is a folding portion 60k that forms the second pouch side wall 14 of the suspended pouch 10 once assembled. At the longitudinal end of the interchangeable element 60 opposite the pouch portion 60t, there are two clamps 28 for fastening said longitudinal end to the central part 24m of the bracket 24.

At the side edge 60r of the pouch portion 60t, four openings 60o can be provided, the positions of which correspond to the positions of the openings 12o in the edge region of the first pouch side wall 12, and through which the clamping clip 70 can be inserted, as shown in FIG. 5b).

The position of the upper edge 60 or of the pouch portion 60t of the interchangeable element 60 can correspond to a bend 70k of the clamping clip 70, the position of which bend corresponds to the hinge connection region 18 of the suspended pouch once assembled.

If, as shown in FIG. 5b), the clamping clip 70 is now first inserted into the pouch portion 60t of the interchangeable element 60 and the clamping clip 70 is then mounted on the basic unit 50 together with the interchangeable element 60 such that the protrusions 70v engage in the openings 12o, and if the clamps 28 are attached to the central part 24m of the bracket 24 acting as the suspension means 20, the interchangeable element 60 is fixed in position on the basic unit 50 in a replaceable manner, thus producing the embodiment shown in FIG. 1 of a suspended pouch 10 according to the invention.

In the embodiment shown, it is possible to use a variety of interchangeable elements that differ on account of the material and/or size of the pouch side wall and/or the resilience of the material used in order to be able to flexibly adapt to different items to be conveyed.

In the process, the same basic unit can be used for a plurality or all of the suspended pouches, thus reducing the costs of a suspended pouch system and also simplifying the operation of the corresponding suspended conveyor device.

To provide simpler, and in particular automated identification and selection of the interchangeable elements, said elements (not shown in the figures) can each be provided with an ID, in particular a barcode or an RFID transponder, which can preferably be read by appropriate reading devices of the suspended conveyor device.

In particular, in a suspended conveyor device of this type, suitable suspended pouches assigned to particular groups of goods can be guided towards the relevant goods or stored close to said goods such that, in this respect, the suspended pouches are already pre-sorted in relation to the goods they are to transport.

The invention claimed is:

1. A suspended pouch acting as a conveyed goods container for transporting goods to be conveyed in a suspended conveyor device, comprising a first pouch side wall and a second pouch side wall which, being opposite one another, define a conveyed goods receiving region therebetween and are interconnected in a hinge connection region such that they can be unfolded and folded up to open and close the conveyed goods receiving region, and comprising a suspension means for suspending the suspended pouch on a guide rail arrangement of a suspended conveyor device, the first pouch side wall comprising a rigid edge contour region and being connected at said region to the suspension means so as to be pivotable with respect to the suspension means about a pivot axis, and the second pouch side wall being connected to the suspension means, or said suspension means being able to act on said second pouch side wall, in such a way that the first and second pouch side wall can be unfolded and folded up by pivoting the first pouch side wall with respect to the suspension means about the pivot axis, wherein the suspended pouch comprises a basic unit and an interchangeable element, the basic unit comprising the suspension means and the rigid edge contour region, and the interchangeable element comprising at least part of the second pouch side wall, and being provided on the basic unit in a replaceable manner.

2. The suspended pouch according to claim 1, wherein the interchangeable element is designed to be repeatedly attached to and released from the basic unit.

3. The suspended pouch according to claim 1, wherein at least portions of the interchangeable element are made of a flexible material.

4. The suspended pouch according to claim 1, wherein the interchangeable element is in the form of a sleeve open on at most two sides or as a pouch open on at most one side.

5. The suspended pouch according to claim 1, wherein the interchangeable element is provided on the basic unit in a replaceable manner by means of a clamping or clip connection.

6. The suspended pouch according to claim 1, wherein the interchangeable element is provided on the basic unit in a replaceable manner by means of buttons, zip fasteners, hook and loop fasteners, or a clamping clip.

7. The suspended pouch according to claim 1, wherein the interchangeable element is provided on the basic unit in a replaceable manner by means of a clamping clip, the basic unit comprising openings, into which protrusions of the clamping clip can be inserted in order to attach the interchangeable element to the basic unit.

8. The suspended pouch according to claim 1, wherein the interchangeable element is provided on the basic unit in a replaceable manner by means of a clamping clip, the basic unit comprising openings in a region of an edge in which a base and the side wall of the first pouch side wall abut one another, into which openings protrusions of the clamping clip can be inserted in order to attach the interchangeable element to the basic unit.

9. The suspended pouch according to claim 1, wherein the interchangeable element is provided on the basic unit in a replaceable manner by means of a clamping clip, the basic unit comprising openings in a region of an edge in which a base and the side wall of the first pouch side wall abut one another, into which openings protrusions of the clamping clip can be inserted in order to attach the interchangeable element to the basic unit, it being possible to attach the second pouch side wall to a central part of a bracket of the suspension means such that the interchangeable element is fixed in position on the basic unit in a replaceable manner.

10. The suspended pouch according to claim 1 wherein the second pouch side wall is connected at one end to a central part of a bracket of the suspension means such that the first and the second pouch side wall are unfolded and folded up by pivoting the first pouch side wall about the pivot axis, openings being provided in a region of an edge in which a base and a side wall of the first pouch side wall abut one another, the interchangeable element being fixed in position on the basic unit in a replaceable manner by a clamping clip being mountable on the basic unit together with the interchangeable element such that protrusions of the clamping clip engage in the openings, and clamps of the interchangeable element being attachable to the central part of the bracket.

11. The suspended pouch according to claim 1, wherein the first pouch side wall comprises a tray and is pivotally connected at the tray to the suspension means, the interchangeable element being provided on the tray in a replaceable manner.

12. The suspended pouch according to claim 1, wherein at least one pouch or a separating element is provided on the interchangeable element to divide the conveyed goods receiving region into a plurality of sub-regions.

13. A suspended pouch system comprising:
at least two suspended pouches wherein each of the suspended pouches act as a conveyed goods container for transporting goods to be conveyed in a suspended conveyor device, each of the suspended pouches comprising:
a first pouch side wall and a second pouch side wall which, being opposite one another, define a conveyed goods receiving region therebetween and are interconnected in a hinge connection region such that they can be unfolded and folded up to open and close the conveyed goods receiving region, and comprising a suspension means for suspending the corresponding suspended pouch on a guide rail arrangement of a suspended conveyor device, the first pouch side wall comprising a rigid edge contour region and being connected at said region to the suspension means so as to be pivotable with respect to the suspension means about a pivot axis, and the second pouch side wall being connected to the suspension means, or said suspension means being able to act on said second pouch side wall, in such a way that the first and second pouch side wall can be unfolded and folded up by pivoting the first pouch side wall with respect to the suspension means about the pivot axis,
wherein each of the suspended pouches comprises a basic unit and an interchangeable element, the basic unit comprising the suspension means and the rigid edge contour region, and the interchangeable element comprising at least part of the second pouch side wall and being provided on the basic unit in a replaceable manner, and wherein each of the suspended pouches differ on account of at least one of the size, shape, and material of the second pouch side wall or of the interchangeable element, at least the edge contour regions and the suspension means, being the same for the at least two suspended pouches.

14. The suspended pouch system according to claim 13, wherein the second pouch side walls or the interchangeable elements are each provided with an ID, for example in the form of a barcode, a two-dimensional (2D) code, or a radio frequency identification (RFID) transponder.

15. A suspended conveyor device comprising:
a suspended pouch system comprising:
at least two suspended pouches wherein each of the suspended pouches act as a conveyed goods container for transporting goods to be conveyed in a suspended conveyor device, each of the suspended pouches comprising:
a first pouch side wall and a second pouch side wall which, being opposite one another, define a conveyed goods receiving region therebetween and are interconnected in a hinge connection region such that they can be unfolded and folded up to open and close the conveyed goods receiving region, and comprising a suspension means for suspending the corresponding suspended pouch on a guide rail arrangement of a suspended conveyor device, the first pouch side wall comprising a rigid edge contour region and being connected at said region to the suspension means so as to be pivotable about a pivot axis, and the second pouch side wall being connected to the suspension means, or said suspension means being able to act on said second pouch side wall, in such a way that the first and second pouch side wall can be unfolded and folded up by pivoting the first pouch side wall about the pivot axis,
wherein each of the suspended pouches comprises a basic unit and an interchangeable element, the basic unit comprising the suspension means and the rigid edge contour region, and the interchangeable element comprising at least part of the second pouch side wall and being provided on the basic unit in a replaceable manner,
wherein each of the suspended pouches differ on account of at least one of the size, shape and material of the second pouch side wall or of the interchangeable element, at least the edge contour regions and the suspension means, being the same for the at least two suspended pouches;
a guide rail arrangement on which the at least two suspended pouches can be moved in a guided manner, and
separate stores for the basic units and the various interchangeable elements, wherein the suspended conveyor device comprises at least one station for the manual or at least partially automated assembly of the at least two suspended pouches, wherein the at least one station is designed to assemble each suspended pouch from one basic unit and one selected interchangeable element.

* * * * *